(12) United States Patent
Steinberg et al.

(10) Patent No.: US 7,796,822 B2
(45) Date of Patent: Sep. 14, 2010

(54) FOREGROUND/BACKGROUND SEGMENTATION IN DIGITAL IMAGES

(75) Inventors: Eran Steinberg, San Francisco, CA (US); Yury Prilutsky, San Mateo, CA (US); Peter Corcoran, Galway (IE); Petronel Bigioi, Galway (IE)

(73) Assignee: FotoNation Vision Limited, Galway (IE)

( * ) Notice: Subject to any disclaimer, the term of this patent is extended or adjusted under 35 U.S.C. 154(b) by 0 days.

(21) Appl. No.: 12/712,006

(22) Filed: Feb. 24, 2010

(65) Prior Publication Data

US 2010/0149371 A1   Jun. 17, 2010

Related U.S. Application Data

(63) Continuation of application No. 11/421,027, filed on May 30, 2006, now Pat. No. 7,680,342, which is a continuation-in-part of application No. 11/217,788, filed on Aug. 30, 2005, now Pat. No. 7,606,417, which is a continuation-in-part of application No. 10/919,226, filed on Aug. 16, 2004, now Pat. No. 7,738,015.

(51) Int. Cl.
    *G06K 9/62* (2006.01)

(52) U.S. Cl. ...................................................... 382/224
(58) Field of Classification Search ................. 382/167, 382/224, 254, 274, 312; 358/1.9, 3.27; 396/89, 396/155, 158, 166–167, 213, 225; 348/207.99, 348/217.1, 221.1–224.1, 227.1, 229.1, 297, 348/362, 364, 366, 370–371
See application file for complete search history.

(56) References Cited

U.S. PATENT DOCUMENTS

| | | | |
|---|---|---|---|
| 7,606,417 B2 * | 10/2009 | Steinberg et al. | 382/173 |
| 7,680,342 B2 * | 3/2010 | Steinberg et al. | 382/224 |
| 7,693,311 B2 * | 4/2010 | Steinberg et al. | 382/118 |
| 7,702,136 B2 * | 4/2010 | Steinberg et al. | 382/118 |

* cited by examiner

*Primary Examiner*—Jose L Couso
(74) *Attorney, Agent, or Firm*—Andrew V. Smith

(57) ABSTRACT

An analysis and classification tool compares at least a portion of a captured image and a reference image of nominally the same scene. One of the captured and reference images is taken with flash and the other is taken without flash. The tool provides a measure of the difference in illumination between the captured image and the reference image. The tool compares the measure with a threshold and segments a foreground region from a background region based on the measure.

43 Claims, 7 Drawing Sheets

FOREGROUND/BACKGROUND SEGMENTATION IN DIGITAL IMAGES

PRIORITY

This application is a continuation (CON) of U.S. patent application Ser. No. 11/421,027, filed May 30, 2006, which is a continuation-in-part (CIP) of U.S. patent application Ser. No. 11/217,788, filed Aug. 30, 2005, which is a CIP of U.S. patent application Ser. No. 10/919,226, filed Aug. 16, 2004, which is related to U.S. applications Nos. 10/635,918, filed Aug. 5, 2003 and 10/773,092, filed Feb. 4, 2004. Each of these applications is hereby incorporated by reference.

BACKGROUND

1. Field of the Invention

The invention relates to an image classification method and system, and to a segmentation method, and in particular to a tool for classifying images as being indoor or outdoor images, and a tool for determining regions indicative of foreground and background, based on exposure analysis of captured and reference images.

2. Description of the Related Art

Image segmentation involves digital image processing wherein an image is broken down into regions based on some predefined criteria. These criteria may be contextual, numerical, shape, size, and/or color-related, gradient-related and more. It is desired to have a technique for determining the foreground and background of digital images for numerous image processing operations. Such operations may include image enhancement, color correction, and/or object based image analysis. In the specific case of processing inside of an acquisition device, it is desired to perform such segmentation expeditiously, while utilizing suitable computations of relatively low complexity, for example, for performing calculations in-camera or in handset phones equipped with image acquisition capabilities.

SUMMARY OF THE INVENTION

A digital image acquisition system having no photographic film is provided. The system includes an apparatus for capturing digital images, a flash unit, and analysis and classification tools. The flash unit provides illumination during image capture. The analysis tool compares at least a portion of a captured image and a reference image of nominally the same scene. One of the captured and reference images is taken with flash and the other is taken without flash. The analysis tool provides a measure of the difference in illumination between the captured image and the reference image. The classification tool compares the measure with a threshold and categorizes the scene as outdoor or indoor based on the measure.

An exposure equalizer may be included for substantially equalizing an overall level of exposure of at least a portion of the captured and reference images prior to analysis by the analysis tool. The classification tool may be responsive to the measure exceeding a high threshold to classify an image as indoor, and responsive to the measure not exceeding a low threshold to classify an image as outdoor. The high and low thresholds may be the same or different. A segmentation tool may also be included for determining regions indicative of foreground and/or background within at least one portion of the captured image. The determining may be effected as a function of a comparison of the captured image and the same or a different reference image of nominally the same scene, or both.

While available ambient light such as sunlight is in general more spatially uniform in nature than strobe lighting, especially for point-and-shoot cameras (as opposed to studio settings with multiple strobe units) that originates from or close to the camera. Due to the fact that the strobe energy is inverse to the square of the distance, the closer the object is, the stronger the light on the object will be. The overall light distribution will vary between the two images, because one shot or subset of shots will be illuminated only with available ambient light while another will be illuminated with direct flash light.

A background/foreground segmented image can be used in numerous digital image processing algorithms such as algorithms to enhance the separation of the subject, which is usually in the foreground, from the background. This technique may be used to enhance depth of field, to enhance or eliminate the background altogether, or to extract objects such as faces or people from an image.

By reducing the area which is subjected to an image processing analysis, processing time is reduced substantially for many real-time algorithms. This is particularly advantageous for algorithms implemented within a digital image acquisition device where it is desired to apply image processing as part of the main image acquisition chain. Thus, the click-to-click time of a digital camera is improved. In certain embodiments it may advantageously allow multiple image processing techniques to be employed where previously only a single technique was applied. It can also serve to reduce occurrences of false positives for certain image processing algorithms where these are more likely to occur in either the background or foreground regions of an image.

The invention may be applied to embedded devices with limited computation capability. It can be used also to improve productivity, in particular where large amounts of images are to be processed, such as for security based facial detection, large volume printing systems or desktop analysis of a collection of images. The invention may be applied to still image capture devices, as well as for video or continuous capture devices with stroboscopic capability.

BRIEF DESCRIPTION OF DRAWINGS

Preferred embodiments will now be described, by way of example, with reference to the accompanying drawings, in which.

DETAILED DESCRIPTION OF PREFERRED EMBODIMENTS

Figure 1:
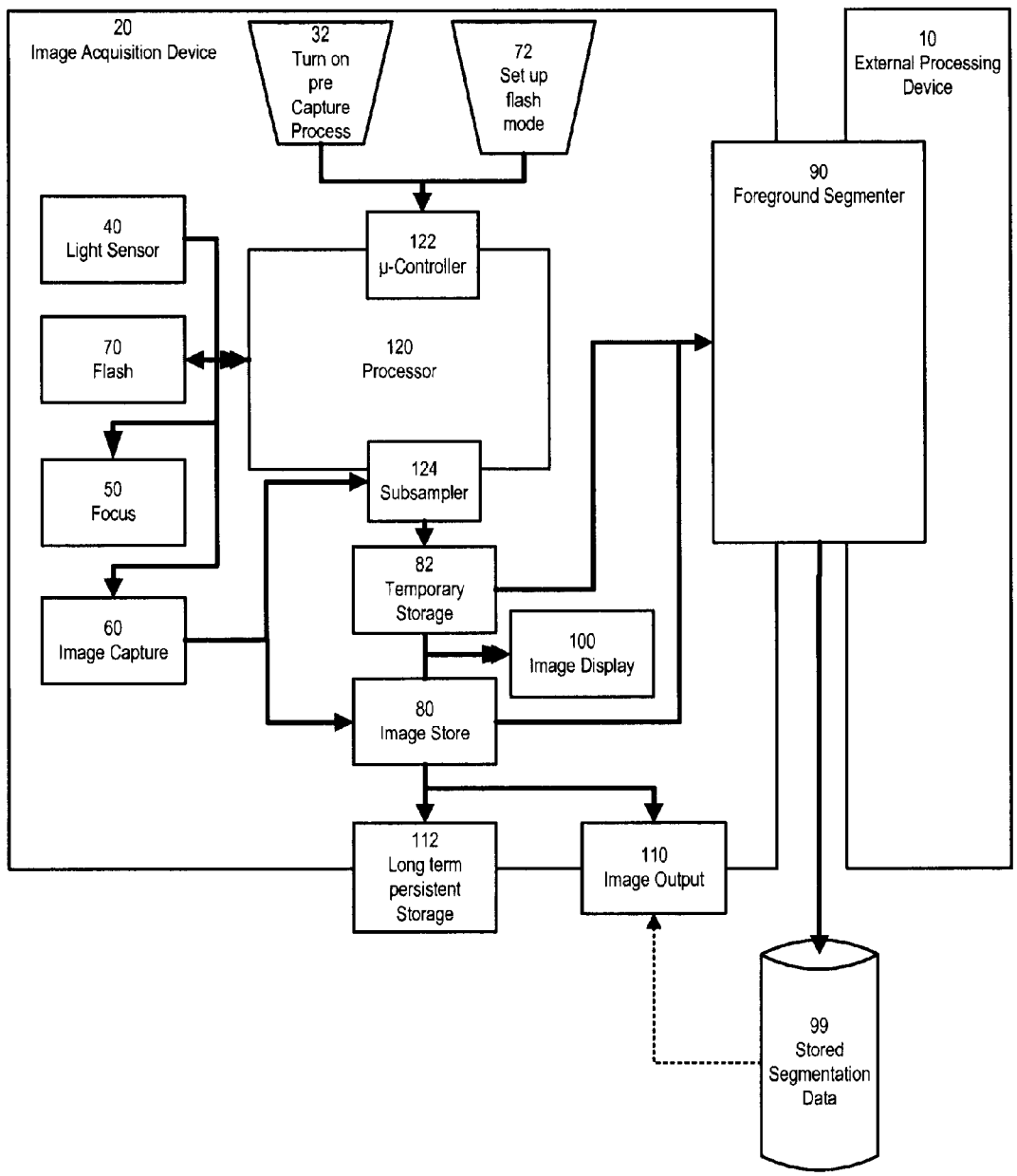
FIG. 1 is a block diagram of a camera apparatus operating in accordance with a preferred embodiment.

FIG. 1 shows a block diagram of an image acquisition device 20 operating in accordance with a preferred embodiment. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, user interface and control of peripheral components such as buttons and display is controlled by a μ-controller 122.

The processor 120, in response to a user input at 122, such as half pressing a shutter button (pre-capture mode 32), initiates and controls the digital photographic process. Ambient light exposure is determined using light sensor 40 in order to automatically determine if a flash is to be used. The distance to the subject is determined using focusing means 50 which also focuses the image on image capture component 60. If a flash is to be used, processor 120 causes the flash 70 to generate a photographic flash in substantial coincidence with the recording of the image by image capture component 60 upon full depression of the shutter button.

The image capture component 60 digitally records the image in color. The image capture component 60 is known to those familiar with the art and may include a CCD (charge coupled device) or CMOS to facilitate digital recording. The flash may be selectively generated either in response to the light sensor 40 or a manual input 72 from the user of the camera. The image I(x,y) recorded by image capture component 60 is stored in image store component 80 which may comprise computer memory such a dynamic random access memory or a non-volatile memory. The camera is equipped with a display 100, such as an LCD, for preview and postview of images.

In the case of preview images P(x,y), which are generated in the pre-capture mode 32 with the shutter button half-pressed, the display 100 can assist the user in composing the image, as well as being used to determine focusing and exposure. A temporary storage space 82 is used to store one or plurality of the preview images and can be part of the image store means 80 or a separate component. The preview image is usually generated by the image capture component 60. Parameters of the preview image may be recorded for later use when equating the ambient conditions with the final image. Alternatively, the parameters may be determined to match those of the consequently captured, full resolution image. For speed and memory efficiency reasons, preview images may be generated by subsampling a raw captured image using software 124 which can be part of a general processor 120 or dedicated hardware or combination thereof, before displaying or storing the preview image. The sub sampling may be for horizontal, vertical or a combination of the two. Depending on the settings of this hardware subsystem, the pre-acquisition image processing may satisfy some predetermined test criteria prior to storing a preview image. Such test criteria may be chronological—such as to constantly replace the previous saved preview image with a new captured preview image every 0.5 seconds during the pre-capture mode 32, until the final full resolution image I(x,y) is captured by full depression of the shutter button. More sophisticated criteria may involve analysis of the of the preview image content, for example, testing the image for changes, or the detection of faces in the image before deciding whether the new preview image should replace a previously saved image. Other criteria may be based on image analysis such as the sharpness, detection of eyes or metadata analysis such as the exposure condition, whether a flash is going to happen, and/or the distance to the subjects.

If test criteria are not met, the camera continues by capturing the next preview image without saving the current one. The process continues until the final full resolution image I(x,y) is acquired and saved by fully depressing the shutter button.

Where multiple preview images can be saved, a new preview image will be placed on a chronological First In First Out (FIFO) stack, until the user takes the final picture. The reason for storing multiple preview images is that the last image, or any single image, may not be the best reference image for comparison with the final full resolution image in. By storing multiple images, a better reference image can be achieved, and a closer alignment between the preview and the final captured image can be achieved in an alignment stage discussed further in relation to FIGS. 2(*a*)-2(*c*) and 4. Other reasons for capturing multiple images are that a single image may be blurred due to motion, the focus not being set, and/or the exposure not being set.

In an alternative embodiment, the multiple images may be a combination of preview images, which are images captured prior to the main full resolution image and postview images, which are image or images captured after said main image. In one embodiment, multiple preview images may assist in creating a single higher quality reference image; either higher resolution or by taking different portions of different regions from the multiple images.

A segmentation filter 90 analyzes the stored image I(x,y) for foreground and background characteristics before forwarding the image along with its foreground/background segmentation information 99 for further processing or display. The filter 90 can be integral to the camera 20 or part of an external processing device 10 such as a desktop computer, a hand held device, a cell phone handset or a server. In this embodiment, the segmentation filter 90 receives the captured image I(x,y) from the full resolution image storage 80 as well as one or a plurality of preview images P(x,y) from the temporary storage 82.

The image I(x,y) as captured, segmented and/or further processed may be either displayed on image display 100, saved on a persistent storage 112 which can be internal or a removable storage such as CF card, SD card, USB dongle, or the like, or downloaded to another device, such as a personal computer, server or printer via image output component 110 which can be tethered or wireless. The segmentation data may also be stored 99 either in the image header, as a separate file, or forwarded to another function which uses this information for image manipulation.

In embodiments where the segmentation filter 90 is implemented in an external application in a separate device 10, such as a desktop computer, the final captured image I(x,y) stored in block 80 along with a representation of the preview image as temporarily stored in 82, may be stored prior to modification on the storage device 112, or transferred together via the image output component 110 onto the external device 10, later to be processed by the segmentation filter 90. The preview image or multiple images, also referred to as sprite-images, may be pre-processed prior to storage, to improve compression rate, remove redundant data between images, align or color compress data.

Figure 2A:
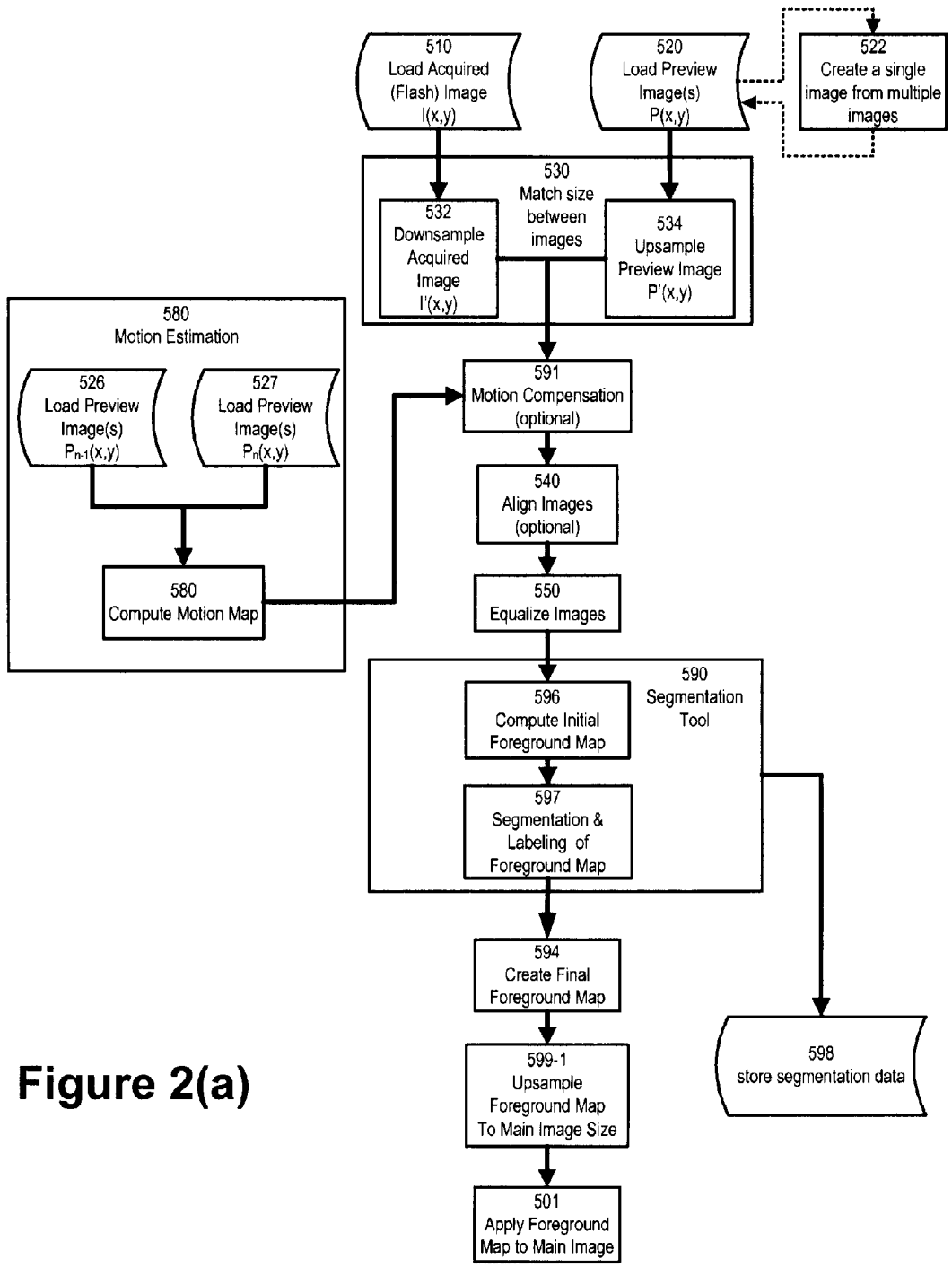
FIGS. 2(*a*), 2(*b*) and 2(*c*) illustrate a detailed workflow in accordance with preferred embodiments.
Figure 2B:
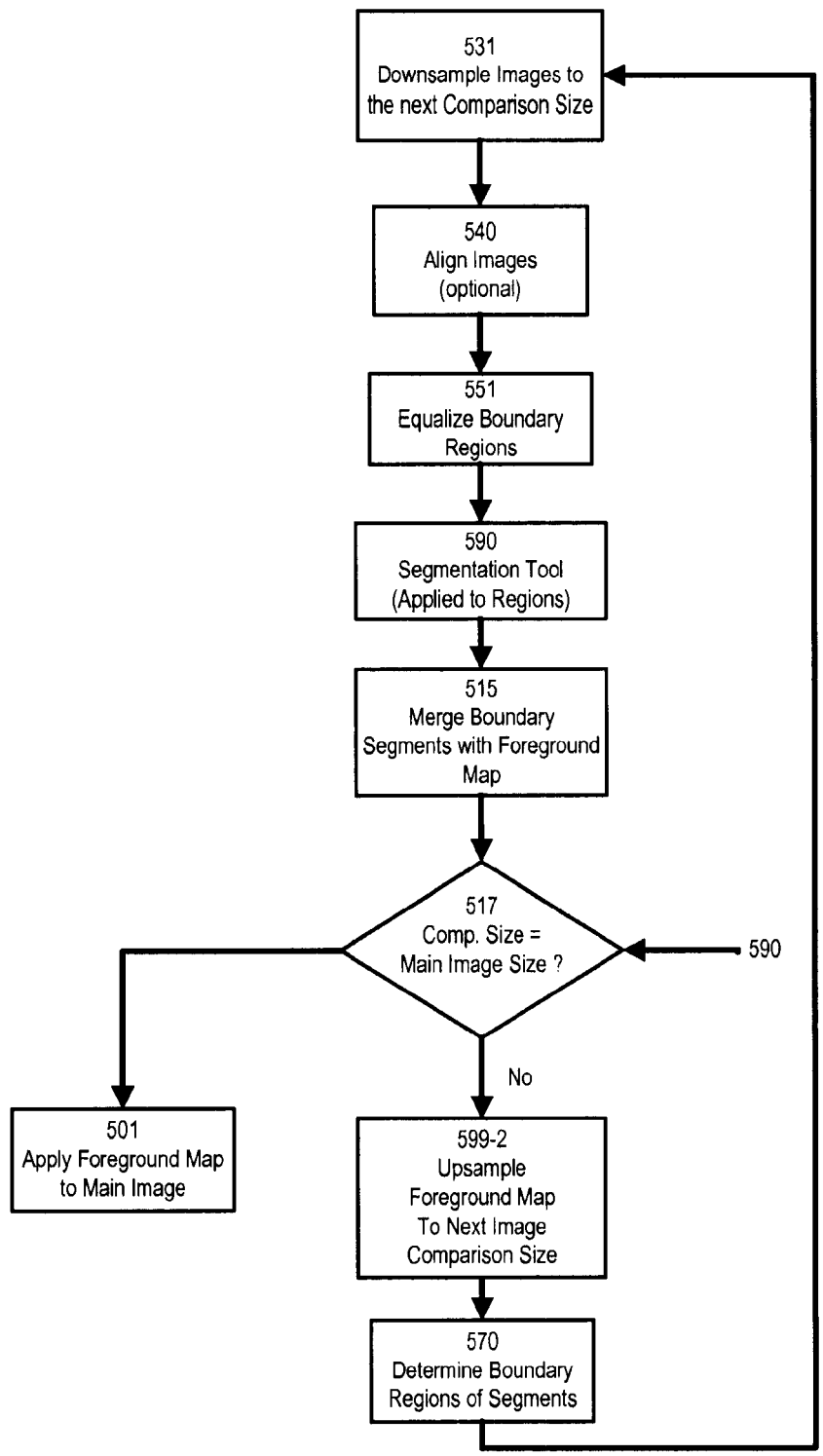

FIGS. 2(*a*)-2(*b*) illustrate a workflow of the segmentation filter 90 of this embodiment. Referring to FIG. 2(*a*), there are two input images into the filter, namely a full resolution flash image I(x,y), 510, which is the one that was captured by full depression of the shutter button and a preview image P(x,y), 520, which is used as a reference image and is nominally the same scene as the image I(x,y) but taken without the flash. The preview image may be a result of some image processing, 522, taking into account multiple preview images and creating a single image. Methods of improving image quality based on multiple images are familiar to those versed in the art of image processing. The resulting output from the analysis process of 522 is a single preview image.

As explained above, the reference image and the final image may have different resolutions. The preview image 520 is normally, but not necessarily, of lower resolution than the full resolution image 510, typically being generated by clocking out a subset of the image sensor cells of the image capture component 60 or by averaging the raw sensor data.

The discrepancy in resolution may lead to differences in content, or pixel values, even though no data was changed in the subject image. In particular, edge regions when down-sampled and then up-sampled may have a blurring or an averaging effect on the pixels. Thus direct comparison of different resolution images, even when aligned, may lead to false contouring.

Therefore, the two images need to be matched in pixel resolution, 530. In the present context "pixel resolution" is meant to refer to the size of the image in terms of the number of pixels constituting the image concerned. Such a process may be done by either up-sampling the preview image, 534, down-sampling the acquired image, 532, or a combination thereof. Those familiar in the art will be aware of several techniques that may be used for such sampling methods. The result of step 530 is a pair of images I'(x,y) and P'(x,y) corresponding to the original images I(x,y) and P(x,y), or relevant regions thereof, with matching pixel resolution.

Where the foreground/background segmentation is done solely for the purpose of improving the detection of redeye artifacts, faces or other image features, the pixel matching as described above can be limited to those regions in the images containing or suspected to contain eyes, faces or other features, as the case may be, which can be determined by image processing techniques. In such a case the subsequent processing steps now to be described may be performed individually on each such region rather than on the images as a whole, and references to the "image" or "images" are to be interpreted accordingly.

The system and method of the preferred embodiment involves the segmentation of the image I(x,y) using exposure discrepancies between I'(x,y) and P'(x,y). It may also be advantageous to apply motion compensation 591 to one or both of the images I'(x,y) and P'(x,y). This can be achieved using two (or more) preview images 526, 527 to create a motion map 580 as described in U.S. application Ser. No. 10/985,657 and its corresponding PCT Application, which are hereby incorporated by reference, as well as other techniques for motion compensation that may be understood by those skilled in the art. In embodiments which incorporate motion compensation, the acquisition parameters for the main image I(x,y) will typically be used to determine if motion compensation is to be applied. Additionally, a user setting may be provided to enable or disable motion compensation. Alternatively, motion compensation may be applied, on a pixel by pixel basis, as part of alignment described below.

Figure 2C:
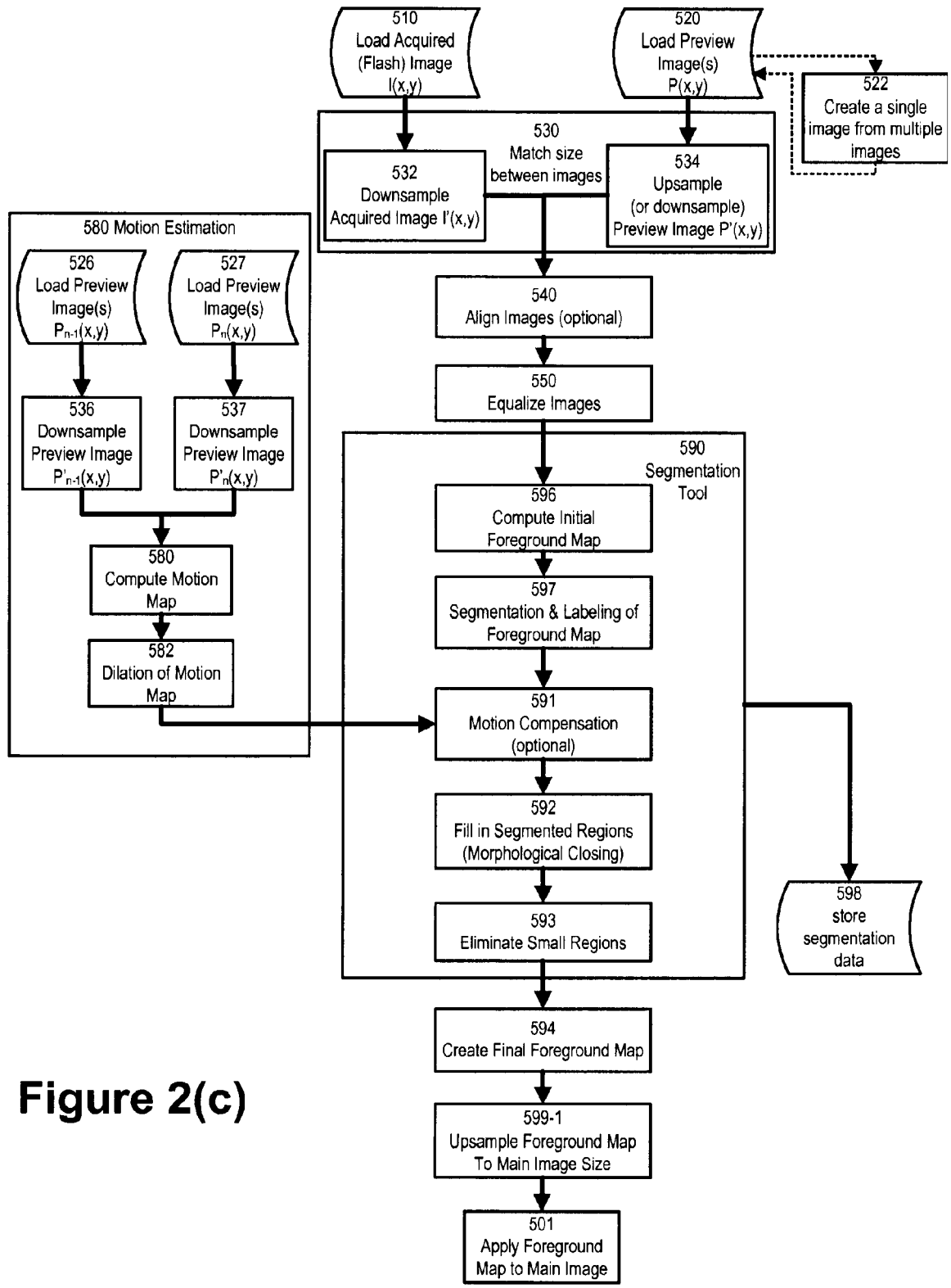

Motion compensation may be employed prior to the generation of a foreground/background map, e.g., where it is desired to eliminate a global motion of the image. However in certain embodiments it may be advantageous to perform a secondary motion compensation operation during the creation of the foreground/background map. This secondary motion compensation is not intended to eliminate a global motion of the image, but rather to compensate for small localized motions that may occur within the image. A good example is that of the leaves of a tree or bush which are fluttering in the wind while an image is being acquired. Such local motions can cause variations in luminance which should be compensated for after the initial foreground/background map is created 596 and segmented 597. Afterwards, a localized motion compensation may be employed to eliminate regions which exhibited localized motion or to subject such regions to more detailed analysis. This is illustrated in FIG. 2(c). In the case of this embodiment, morphological closing 592 and elimination of small regions 593 are included. Techniques to implement each of these are known to those skilled in the art of image segmentation.

Although nominally of the same scene, the preview image and the finally acquired full resolution image may differ spatially due to the temporal lag between capturing the two images. The alignment may be global, due to camera movement or local due to object movement, or a combination of the two. Therefore, the two images are advantageously aligned 540 in accordance with a preferred embodiment. Essentially, alignment involves transforming at least portions of one of the images, and in this embodiment the preview image P'(x,y), to obtain maximum correlation between the images based on measurable characteristics such as color, texture, edge analysis. U.S. Pat. No. 6,295,367 is hereby incorporated by reference as disclosing techniques for achieving alignment. The technique may align images that are initially misaligned due to object and camera movement. U.S. Pat. No. 5,933,546 is also hereby incorporated by reference. Multi-resolution data may be used for pattern matching. Alignment is also discussed further in relation to FIG. 4.

The images are then equalized for exposure and possibly in color space 550. Equalisation attempts to bring the preview image and the flash full resolution image to the same overall level of exposure. The equalization can be achieved in different manners. The goal is to ensure that both images, preview and final have the same ambient conditions or a simulation of them. Specifically, the preview image is preferably conveyed having the same overall exposure as the flash image. In most cases, when using flash, even in a fill-flash mode, the final image will use a lower ambient exposure, to prevent over exposure due to the flash. In other words, the overall ambient exposure of the flash image is lower. In other words, the exposure on the foreground should remain constant after adding the flash light, and thus there is a need use a smaller aperture or shorter shutter speed. The equalization may be done analytically by matching the histograms of the images. Alternatively if the overall ambient exposure, which is depicted as function of aperture, shutter speed, and sensitivity (or gain) can be calculated and if the exposure is different, the pixel value can be modified, up to clipping conditions, based on the ratio between the two. Note that the exposure might not be equal in all channels and may also include a stage of color correction which compensates for different exposures for the various color channels. An example of this is when the ambient light is warm, such as incandescent, while the final image using flash is closer to daylight in terms of the overall color temperature.

In an alternative method, when the final ambient exposure is known, the preview image used as reference can be acquired with the same equivalent exposure. This can serve to eliminate the equalization stage. Note that in such case, the preview image may not be optimal to ambient conditions, but it is equalized with the final flash image.

Figure 3:
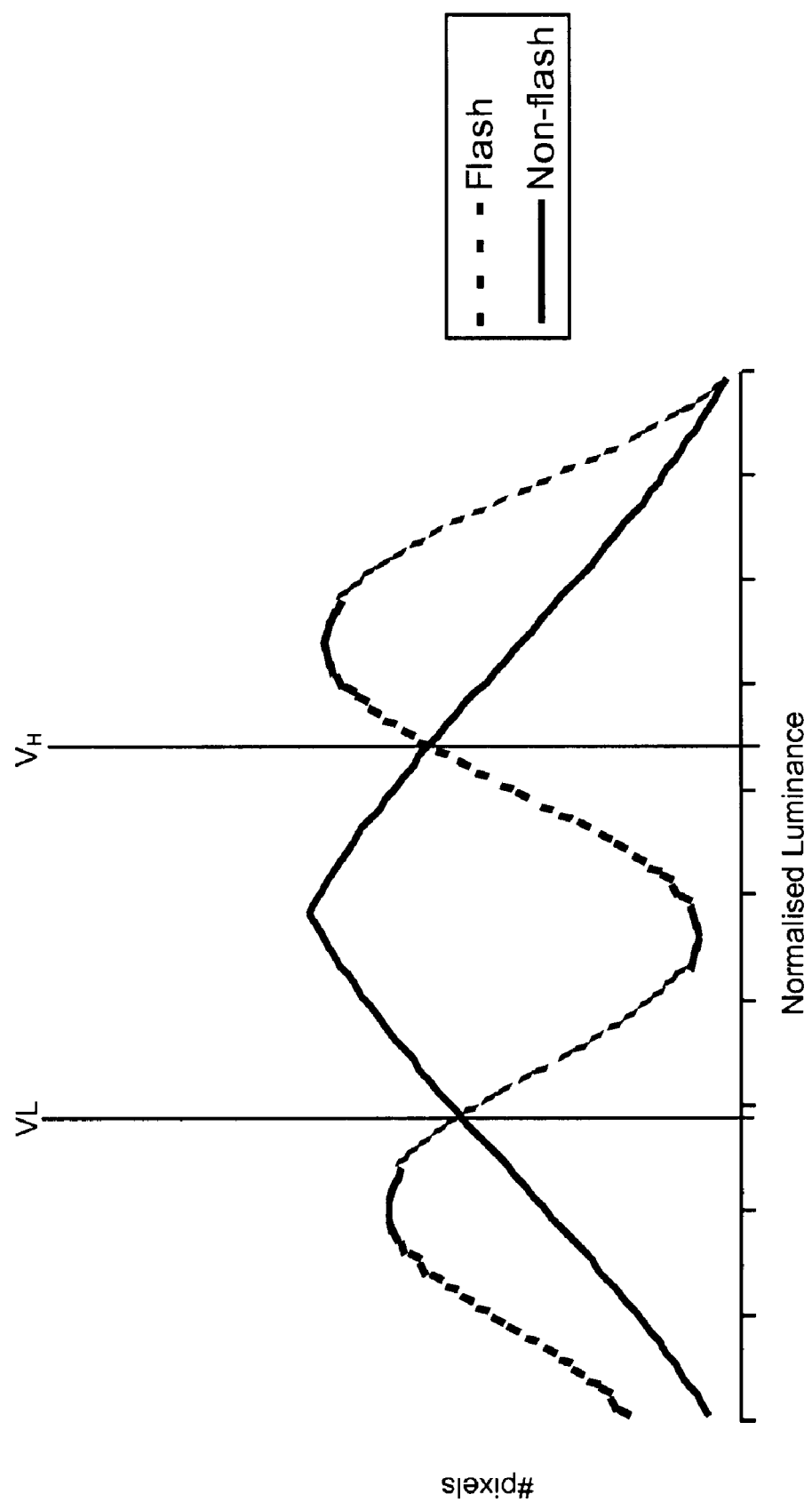
FIG. 3 is a graph illustrating the distributions in pixel intensities for a flash and non-flash version of an image.

As can be seen from FIG. 3, an idealised non-flash image of a scene containing some foreground objects can be considered to have a generally unimodal distribution of luminance levels across all pixels. Where a scene is well lit, the peak of the distribution tends to be at a higher luminance level, whereas for dimly light scenes, the peak will tend to be a lower luminance level. In a flash version of the same scene, pixels corresponding to foreground objects will tend to have increased luminance levels due to the proximity to the flash source. However, pixels corresponding to background objects will tend to have relatively reduced luminance levels. Thus, in a preferred embodiment, pixel luminance levels for a flash version image of a scene are mapped to luminance levels which bring the non-flash (preview) image and the flash version image of the scene to the same overall level of exposure. This mapping g( ) can be represented as follows:

$$\int_x^y P''(x, y) = g(P'x, y), x, y) \int_x^y P'(x, y)$$

In the simplest case, the function g() is a constant, in general greater than 1, mapping exposure levels in a preview image P'(x,y) to produce an altered image P"(x,y) having the same overall exposure level as the flash version image I'(x,y). (Alternatively, the image I'(x,y) could be mapped to I"(x,y).) In the simplest implementation of this case, both images I'(x,y) and P'(x,y) are converted to greyscale and the mean luminance for each image is computed. The luminance values of one of the images are then adjusted so that the mean luminance values of the altered image P"(x,y) and the image I'(x,y) match.

However, the function g( ) can be dependent on the original exposure level of a pixel P'(x,y), for example, to prevent color saturation or loss of contrast. The function may also be dependent on a pixel's (x,y) location within an image, perhaps tending to adjust more centrally located pixels more than peripheral pixels.

Nonetheless, it will be seen from FIG. 3 that in a pixel by pixel comparison, or even a block-based comparison (each block comprising N×N pixels within a regular grid of M×M regions), the adjusted flash version of the image has a bimodal distribution between the exposure levels of background and foreground objects.

In preferred embodiments, during equalisation, one or more thresholds $V_H$, $V_L$ and possibly block size n are determined for later use in determining the background and foreground areas of the image I'(x,y). The threshold process is based on finding the optimal threshold values in a bimodal distribution and with the benefit of a reference unimodal non-flash image. Suitable techniques are described in the literature and are known to one familiar in the art of numerical classification. Nonetheless, as an example, the upper threshold level $V_H$ could be taken as the cross-over luminance value of the upper bimodal peak and the unimodal distribution, whereas the lower threshold $V_L$ could be taken as the crossover of the lower bimodal peak and the unimodal distribution. It will be appreciated that the distribution of pixel exposure levels may not in practice be smooth and there may be several cross-over points in raw image data, and so some smoothing of the luminance distribution may need to be performed before determining such cross-over points and so the thresholds.

After the thresholds $V_H$, $V_L$ are determined, the image is processed via a segmenting tool, 590, to designate pixels or regions as background or foreground. In one embodiment, pixels whose values change less than a threshold amount, say $V_H$-$V_L$ (or some other empirically determined value) between flash I'(x,y) and non-flash versions P"(x,y) of the image represent pixels in areas of a flash-image forming a boundary between background and foreground objects. When such individual pixels are linked, then segments of the image I'(x, y) substantially enclosed by linked boundary pixels and having pixel values on average brighter than in the corresponding segment of the non-flash image P"(x,y) are designated as foreground, whereas segments of the image substantially enclosed by boundary pixels and having pixel values on average darker than in the corresponding segment of the non-flash image are designated as background.

In a second embodiment, foreground pixels in a flash image are initially determined at step 596 as those with exposure levels greater than the upper exposure threshold value $V_H$ and background pixels in a flash image are those with exposure levels less than the lower exposure threshold value $V_L$.

In a still further embodiment of step 596, thresholds are not employed and initial segmentation is achieved simply by subtracting the local exposure values for each image on a pixel by pixel or block by block (each block comprising n×n pixels) basis to create a difference map. Typically, foreground pixels will have a higher (brighter) value and background pixels will have a lower value.

In each of the cases above, the segmentation tool 590 has preferably traversed each of the preview image P and the flash image I and examined a difference in exposure levels for corresponding areas of the images, either pixel-by-pixel or block-by-block. For flash images taken indoors, dark regions get darker and bright regions (typically foreground) get brighter. However, for images of outdoor scenes, the foreground generally gets marginally brighter, and the background is mostly unchanged.

If during the analysis performed by the segmentation tool 590, using the luminance values of the preview P and flash images I, the degree of darkening of the background regions and brightening of foreground regions exceeds a threshold, an image can be classified as indoor. If the relative brightening and darkening do not exceed the same or a different threshold, the image can be classified as outdoor. It can be seen that this classification can be advantageously added to image metadata for use in further processing.

Across an image, brightening of the foreground will tend to cancel darkening of the background especially when overall luminance levels have been equalized between images. In a preferred embodiment, a change in luminance may be measured as a Euclidean distance between preview and flash images. The measurement is preferably made as follows:

(i) measure the luminance histogram of local blocks of n×n pixels of each image. This can be taken as an average luminance across a block.

(ii) Next, calculate an absolute value of the "difference" between preview and flash images.

(iii) Then, sum this measure over the full image, or substantially the full image, to get an "absolute luminance difference".

This absolute luminance difference value tends to be well above a threshold value for indoor images and well below that threshold for outdoor images. In simple terms, the foreground tends to be less bright and the background less dark in outdoor images, thus the variance in local luminance between non-flash and flash images is much lower. In variants of this implementation separate higher and lower thresholds can be used. Thus, if the difference is below the lower threshold, an image is classified as outdoor and if the difference is above an upper threshold, an image is classified as indoor.

In further variations of the above implementation, the classification can be performed on regions of the image which have been designated as foreground and/or background only. Thus, if the overall luminance of foreground regions increased by more than a threshold, an image could be classified as indoor; and/or if the overall luminance of background regions decreased by more than a threshold, an image could be classified as indoor. Alternatively, if the overall luminance of respective foreground and/or background regions changed by less than a threshold, the image could be classified as outdoor.

Where an image of a scene is classified as outdoor, then a non-flash based scheme for foreground/background separation can be employed, for example, as disclosed in U.S. Application No. 60/773,714, filed Feb. 14, 2006, which is hereby incorporated by reference, and U.S. application Ser. No. 11/319,766, filed Dec. 27, 2005, and U.S. application Ser. No. 60/776,338, filed Feb. 24, 2006, are also hereby incorporated by reference.

Figure 5:
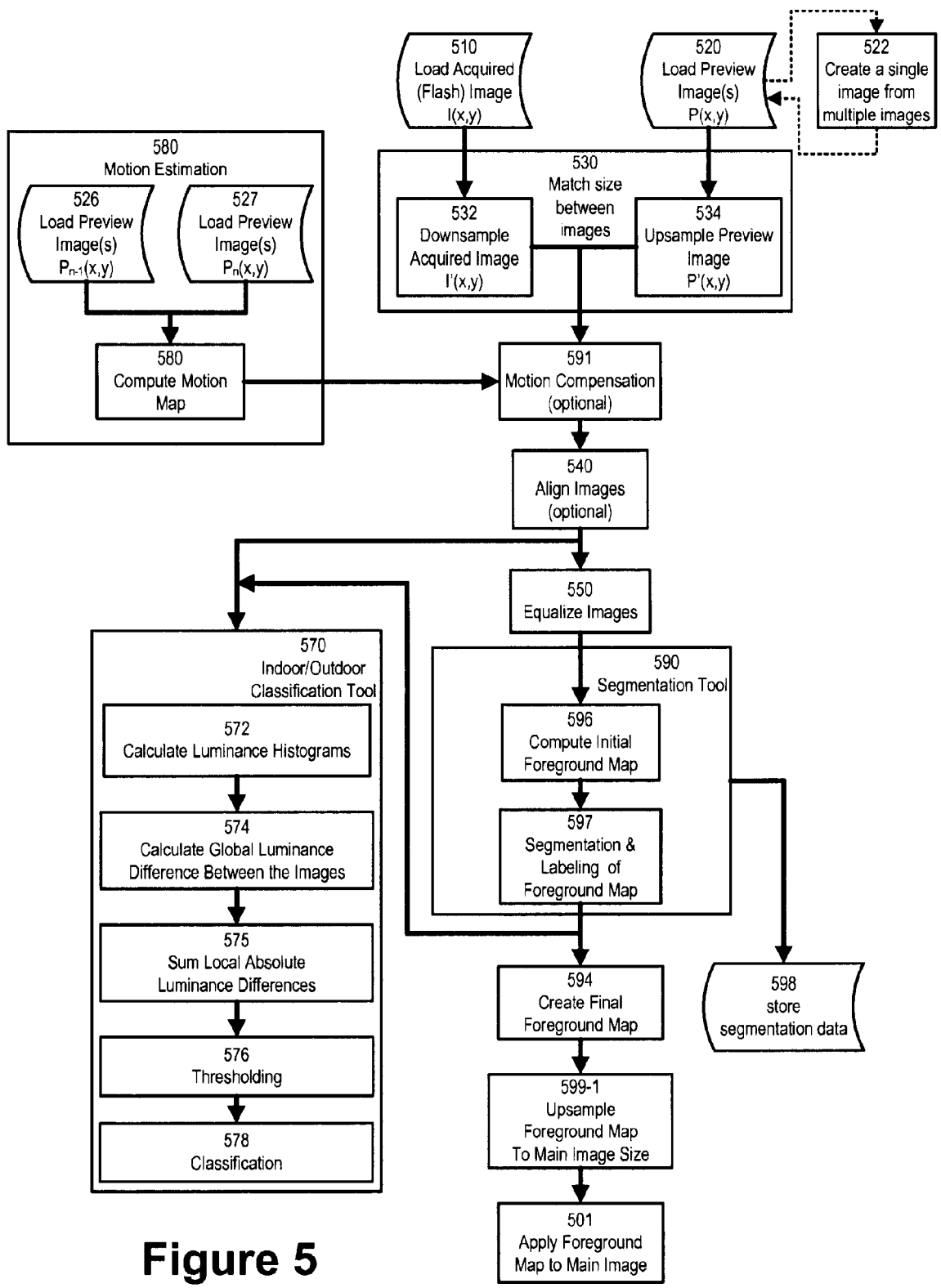
FIG. 5 is a flow diagram illustrating a process including indoor/outdoor classification in accordance with a preferred embodiment.

FIG. 5 is a flow diagram illustrating a process including indoor/outdoor classification in accordance with a preferred embodiment. An acquired flash image I(x,y) is loaded at 510. A preview image P(x,y) is loaded at 520. A single preview image P may be created from multiple images at 522 by combining them and/or by selecting the best one or best subset to be used. Beginning at 530, matching of the preview image P and flash image I is performed. Either or both of 532 and 534 may be performed. At 532, the acquired flash image I is downsampled to match the preview image P, while at 534, the preview image P is upsampled to match the flash image I in size and/or resolution. Another alternative embodiment includes a technique that involve both upsampling of the preview image P and downsampling of the acquired image I, and another wherein both images P and I are upsampled different amounts or to different degrees, or downsampled different amount or to different degrees to match size and/or resolution.

An optional motion estimation process 580 may be performed. Consecutive or otherwise temporally displaced preview images $P_{n-1}(x, y)$ and $P_n(x, y)$ may be loaded at 526 and 527 in FIG. 5. More than two preview images may be used, and in an alternative embodiment, one preview image P and a flash image I may be used. A motion map may then be computed at 580 based on analysis of the temporally sequenced preview images loaded at 526 and 527, and motion compensation is performed at 591 based on the motion map computed at 580.

At 540, images are optionally aligned. This provides still enhanced matching of the preview image P and the flash image I loaded at 520 and 510, respectively. For example, one or both images, or portions thereof, may be translated and/or rotated so that one or more features of the two images are aligned. Matching using 530 and/or 540 improves the quality and accuracy of comparison of features over a technique that might be used in an alternative embodiment wherein the images are not matched.

The method of FIG. 5 now involves one or both of indoor/outdoor classification and segmentation. Images are equalized at 550 in the flow diagram of FIG. 5, after which segmentation is performed at 590. Segmentation preferably involves computing an initial foreground map at 596 and segmentation and labelling of the foreground map at 597. Segmentation data is stored at 598. At this point, the method may or may not proceed to indoor/outdoor classification at 570. A final foreground map may be determined at 594 either without any indoor/outdoor classification, or in parallel with such classification, or at another time different from when the indoor/outdoor classification is being performed at 570. After the final foreground map is created at 594, the foreground map is preferably upsampled to a main image size at 599-1, and the foreground map is applied to a main image at 501.

Indoor/outdoor classification at 570 preferably involves calculating luminance histograms of the matched images P and I at 572. Then, a global luminance difference is calculated between the images P and I at 574. A sum of local absolute luminance differences is taken at 575 with the global luminance difference being used as reference value for this summation. Thresholding is performed at 576, wherein the differences determined at 575 are deemed either to meet one or more thresholds or not. When the thresholding is completed, classification is performed occurs at 578 such as described above. For example, when the differences determined at 575 are deemed to be above an indoor threshold at 576, then an indoor classification may be assigned at 578, whereas when the differences determined at 575 are deemed at 576 to be below the same threshold or a specific outdoor threshold that is lower than the indoor threshold, then an outdoor classification may be assigned at 578. The results of this classification may be stored and used within the camera for subsequent post-processing, sorting and image management operations.

A technique by which a block by block averaging can be advantageously achieved in a state-of-art digital camera is to employ a hardware subsampler 124 where available. This can very quickly generate a subsampled 1/n version of both images where each pixel of each image represents an average over an N×N block in the original image.

In certain embodiments, after an initial matching of size between preview and main image, further subsampling may be implemented prior to subtracting the local exposure values for each image on a pixel by pixel basis. After an initial foreground/background map is determined using the smallest pair of matched images, this map may be refined by applying the results to the next largest pair of subsampled images, each pixel now corresponding to an N×N block of pixels in the larger pair of images.

A refinement of said initial map may be achieved by performing a full pixel-by-pixel analysis, of the larger pair of matched images, only on the border regions of the initial foreground/background map. It will be appreciated that where a hardware subsampler is available that generating multiple sets of matched subsampled images is relatively inexpensive in terms of computing resources. In certain embodiments performing a series of such refinements on successively larger pairs of matched subsampled images can advantageously eliminate the need for alignment and registration of the images. The advantages of this technique must be balanced against the requirement to temporarily store a series of pairs of matched subsampled images of successively decreasing size.

Each of the processes involving threshold comparisons may also take into account neighbouring pixel operations where the threshold value or comparison is dependent on the surrounding pixel values to eliminate noise artifacts and slight shifts between the preview and the final image.

Nonetheless, it will be seen that the determination of background/foreground membership is not achieved with complete accuracy using a single pass pixel-based or block-based analysis alone. As an example, consider a person with a striped shirt. It may be that the corrected luminance of the dark stripes actually indicates they are background pixels even though they are in close proximity to a large collection of foreground pixels.

Accordingly it is advantageous to incorporate additional analysis and so, following the creation of an initial foreground map, even if this has been performed on a n×n block rather than pixel basis, the foreground pixels/blocks are segmented and labelled 597. This step helps to eliminate artifacts such as a striped shirt and those due to image noise or statistical outliers in the foreground map. It is also advantageous to eliminate small segments.

Thus a final map (mask) of foreground pixels is created 594. This may now be upsized to match the size of the main acquired image, 599-1, and can be advantageously employed for further image processing of the main image, 501. For example, although not shown, the system may include a face detector or redeye filter, and in such a case 501 can include techniques for applying these selectively to the foreground region defined by the mask, thus reducing the execution time for such algorithms by excluding the analysis of background segments. Alternatively, where the system includes a component for identifying redeye candidate regions 501, U.S. patent application Ser. No. 10/976,336 is hereby incorporated by reference. This component can implement a redeye falsing analysis by increasing or decreasing the probability of a redeye candidate region being an actual redeye region according to whether the candidate appears in the foreground or background of the captured image.

As was already mentioned, in a preferred embodiment it may be advantageous to initially employ aggressive downsampling of the images 510, 520. This may eliminate the need for the alignment step 540 and, if the present invention is applied recursively and selectively on a regional basis, a full-sized foreground mask can be achieved without a great increase in computation time.

Referring back now to FIG. 2(*b*), where it is assumed that during the size matching 530 of FIG. 2(*a*), several pairs of matching images are created or, alternatively, are created dynamically on each recursion through the loop of FIG. 2(*b*). For example, consider a main image of size 1024×768 with a preview of size 256×192. Let us suppose that three sets of matching images are created at resolutions of 1024×768 (preview is upsized by 4×), 256×192 (main image is downsized by 4×) and at 64×48 (main image downsized by 16× and preview downsized by 4×). Now we assume that the initial analysis is performed on the 64×48 image as described in FIG. 2(*a*) as far as the segmentation tool step 590.

After the step 590, an additional step 517 determines if the comparison size (the image size used to generate the latest iteration of the foreground map) is equal to the size of the main flash image I(x,y). If not then the foreground map is upsized to the next comparison size 599-2—in this case 256×192 pixels. Each pixel in the original map is now enlarged into a 4×4 pixel block. The regions forming the boundary between foreground and background segments—they were pixels at the lower map resolution—of this enlarged map are next determined 570 and the downsampled images of this comparison size (256×192) are loaded 531. In this case, the technique may be applied to the entire image or a portion of the entire image at the higher resolution as regions within foreground segments are determined to definitely be foreground regions. In this embodiment, it is only the boundary regions between background and foreground that are analyzed. The same analysis that was applied to the main image are now applied to these regions. They may be aligned 540, before being equalizing 551, and the segmentation tool 590 is applied to each 16×16 region. The results are merged with the existing foreground map 515.

If the foreground map is now of the same size as the main flash image 517 then it can be directly applied to the main image 501. Alternatively, if it is still smaller then it is upsampled to the next image comparison size 599-2 and a further recursion through the algorithm is performed.

The segmented data is stored, 598 as a segmentation mask as in FIG. 2(*a*). If necessary in order to return to the original image size, the segmentation mask will need to be up-sampled, 599 by the same factor the acquired image was down-sampled in step 532. The upsampling 599 should be sophisticated enough to investigate the edge information in the periphery of the mask, to ensure that the right regions in the upsampled map will be covered. Such techniques may include upsampling of an image or a mask while maintaining edge information.

Figure 4:
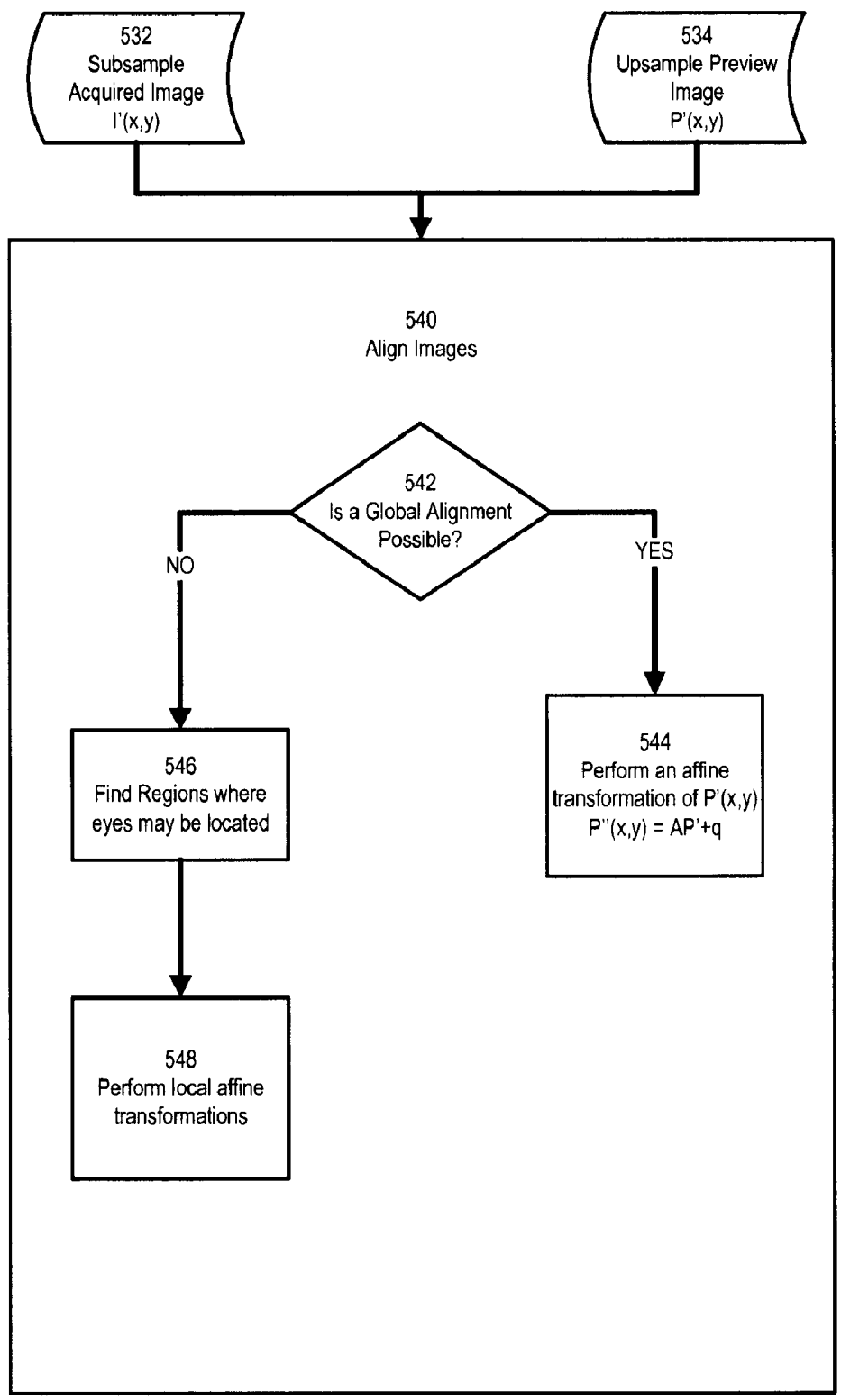
FIG. 4 illustrates the alignment process used in the workflow of FIG. 2(*a*).

FIG. 4 shows the workflow of the alignment function 540 of FIG. 2(*a*), where the inputs are the two images I'(x,y) and P'(x,y) as defined in relation to FIG. 2(*a*). The alignment may be global for the entire image or local for specific regions. Global movement may be caused by camera movement while local movement may be caused by object movement during the exposure interval of the image. For example, a simple linear alignment, such as a shift in the horizontal direction by H pixels, and/or in the vertical direction by V pixels, or a combination of the two. Mathematically, the shifted image, P"(x,y), can be described as:

$$P''(x,y)=P'(x-H,y-V)$$

However, simple translation operation assumes shift invariance which may not suffice in the aligning of the image. Even in the case of camera movement, such movement may include a Affine transformation that includes rotation, and shear as well as translation. Therefore, there may be a need for X-Y shearing, which is a symmetrical shift of the object's points in the direction of the axis to correct for perspective changes; X-Y tapering where the object is pinched by shifting its coordinates towards the axis, the greater the magnitude of the coordinate the further the shift; or rotation around an arbitrary point.

In general, the alignment process may involve an Affine transformation, defined as a special class of projective transformations that do not move any objects from the affine space $E^a$ to the plane at infinity or conversely, or any transformation that preserves co linearity (i.e. all points lying on a line initially still lie on a line after transformation) and ratios of distances (e.g., the midpoint of a line segment remains the midpoint after transformation). Geometric contraction, expansion, dilation, reflection, rotation, shear, similarity transformations, spiral similarities and translation are all affine transformations, as are their combinations. In general, the alignment 540 may be achieved via an affine transformation which is a composition of rotations, translations, dilations, and shears, all well-known to one familiar in the art of image processing.

If it is determined through a correlation process that a global transformation suffices, as determined in block 542=YES, one of the images, and for simplicity the preview image, will undergo an Affine transformation, 544, to align itself with the final full resolution image. Mathematically, this transformation can be depicted as:

$$P''=AP'+q$$

where A is a linear transformation and q is a translation.

However, in some cases a global transformation may not work well, in particular for cases where the subject matter moved, as could happen when photographing animated objects. In such case, in particular in images with multiple human subjects, and when the subjects move in independent fashion, the process of alignment 540 may be broken down, 546, to numerous local regions each with its own affine transformation. In the case of the use of the present technique for redeye detection and correction, it is preferred to align the eyes between the images. Therefore, according to this alternative, one or multiple local alignments may be performed, 548, for regions in the vicinity surrounding the eyes, such as faces.

Only after the images are aligned are the exposure value between the images equalised as in FIG. 2(*a*).

The preferred embodiments described above may be modified by adding or changing operations, steps and/or components in many ways to produce advantageous alternative embodiments. For example, the reference image can be a post-view image rather than a preview image, i.e. an image taken without flash immediately after the flash picture is taken.

Alternatively, the reference image could be the flash image and the full resolution captured image the non-flash image. An example of this is when the camera is set up in a special mode (similar to a portrait scene selection mode), so that the preview image is the one with the flash while the final image may be with no flash. In this case, the roles of the images reverse in terms of calculating the difference between the images. Additionally, the reference image may be either a preview image or a post-view image.

The preferred embodiments described herein may involve expanded digital acquisition technology that inherently involves digital cameras, but that may be integrated with other devices such as cell-phones equipped with an acquisition component or toy cameras. The digital camera or other image acquisition device of the preferred embodiment has the capability to record not only image data, but also additional data referred to as meta-data. The file header of an image file, such as JPEG, TIFF, JPEG-2000, etc., may include capture information including the preview image, a set of preview images or a single image that is processed to provide a compressed version of selected reference images, for processing and segmentation at a later post processing stage, which may be performed in the acquisition device or in a separate device such as a personal computer.

In these embodiments, in the comparison stages, the pixel values may be compared for lightness. Alternatively or additionally, these can be compared with other values such as color. An example of chromatic comparison is warm coloring such as yellow tint that may indicate incandescent light or blue tint that may indicate shade regions in sunlit environment, or other colors indicative of change between ambient lighting and the flash lighting. The comparison may be absolute or relative. In the absolute case the absolute value of the difference is recorded regardless to which of the images has the larger pixel value. In the relative case, not only the difference but also the direction is maintained. The two techniques may also assist in establishing the registration between the two images. In the case the subject slightly moves, for example horizontally, the relative difference may indicate a reversal of the values on the left side of the object and the right side of the object.

In certain embodiments it may also prove advantageous to employ a "ratio map" rather than a "difference map". In such embodiments a ratio between the pixel luminance values of the two images (flash and non-flash) is determined. This technique can provide better results in certain cases and may be employed either as an alternative to a simple subtraction, or in certain embodiments it may be advantageous to combine output regions derived from both techniques using, logical or statistical techniques or a combination thereof, to generate a final foreground/background map.

The present invention is not limited to the embodiments described above herein, which may be amended or modified without departing from the scope of the present invention as set forth in the appended claims, and structural and functional equivalents thereof. In addition, United States published patent application no. 2003/0103159 to Nonaka, Osamu, entitled "Evaluating the effect of a strobe light in a camera" is hereby incorporated by reference as disclosing an in-camera image processing method for correcting shadow regions in a flash image.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

What is claimed is:

1. A digital image acquisition system having no photographic film, comprising:
   (a) an apparatus for capturing digital images, including a lens, an image sensor and a processor;
   (b) a flash unit for providing illumination during image capture;
   (c) an analysis tool for comparing at least a portion of a captured image and a reference image of nominally the same scene, one of said captured and reference images being taken with flash and the other being taken without flash, said analysis tool providing a measure of relative differences in illumination between regions of said captured image and said reference image of groups of pixels within said scene; and
   (d) a classification tool for segmenting a foreground region from a background region within said scene based on said measure.

2. A system according to claim 1, further comprising an exposure equalizer for substantially equalizing an overall level of exposure of at least said portion of said captured and reference images prior to analysis by said analysis tool.

3. A system according to claim 1 further comprising a segmentation tool for determining one or more regions that are indicative of the foreground region, or of the background region, or of the background region and the foreground region, within at least one portion of a captured image, and wherein said analysis tool is arranged to analyse said foreground region or said background region, or both.

4. A system according to claim 1, wherein said classification tool is responsive to said measure exceeding a high threshold to classify a region as a foreground region, and responsive to said measure not exceeding a low threshold to classify a region as a background region.

5. A system according to claim 4, wherein said high and low threshold are coincident.

6. A system according to claim 1, further comprising a segmentation tool for determining one or more regions that are indicative of the foreground region, or of the background region, or of the background region and the foreground region, within at least one portion of the captured image, wherein said determining comprises comparing said captured image and the same reference image or a different reference image of nominally the same scene, or both.

7. A system according to claim 6, wherein the captured and reference images have different pixel resolutions, and wherein the system further comprises a pixel matching tool which is operative prior to application of the segmentation tool for matching the pixel resolutions of the captured and reference images at least in respect of said at least one portion.

8. A system according to claim 7, wherein said pixel matching tool utilizes up-sampling of the image of lower resolution or sub-sampling of the image of higher resolution, or both.

9. A system according to claim 6, further comprising an alignment tool which is operative prior to application of the segmentation tool for aligning said regions of said captured and reference images at least in respect of said at least one portion.

10. A system according to claim 6, further comprising an exposure equalizer for substantially equalizing an overall level of exposure of said regions or all of said captured and reference images at least in respect of said at least one portion.

11. A system according to claim 10, wherein the substantially equalising of the overall level of exposure of said regions or all of said captured and reference image comprises simulating an ambient exposure of the captured image on the reference image.

12. A system according to claim 11, wherein the simulating of the ambient exposure of the captured image on the reference image comprises digitally simulating a one or a combination of aperture, acquisition speed, color transformations and gain of the captured image on the reference image.

13. A system according to claim 11, wherein the simulating of the ambient exposure of the captured image comprises individual, non-uniform manipulating of individual regions or color channels or combinations thereof.

14. A system according to claim 10, wherein the substantially equalising of the overall level of exposure of said captured and reference image comprises setting an ambient exposure of the reference image to match a calculated exposure of the captured image.

15. A system according to claim 10, wherein at least in respect of said at least one portion, the segmentation tool determines corresponding pixels in the captured and reference images whose values differ by less than a predetermined threshold, and designates segments of the captured image bounded by said determined pixels as foreground or background by comparing pixel values in a segment with pixel values in a corresponding segment of the reference image.

16. A system according to claim 10, wherein at least in respect of said at least one portion, the segmentation tool determines upper and lower thresholds based on a comparison of the overall level of exposure of the captured and reference images and designates pixels of the captured image as foreground or background according to whether their values are greater than the upper threshold or less than the lower threshold.

17. A system according to claim 10, wherein at least in respect of said at least one portion, the segmentation tool designates one or more segments of the captured image as foreground or background by comparing pixel values in the captured and reference images.

18. A system according to claim 10, wherein the reference image comprises a preview image having a lower pixel resolution than the captured image, and the captured image comprises the image taken with flash.

19. A system according to claim 6, further comprising a face detection module.

20. A system according to claim 6, further comprising a red-eye detection filter or a red eye correction filter or both, for selective application to the foreground region.

21. A system according to claim 20, further comprising a probability module for changing a probability of a redeye candidate region being an actual redeye region according to whether the candidate appears in the foreground or background of the captured image.

22. A system according to claim 1, further comprising a depth of focus module for reducing a perceived depth of focus according to whether a candidate region appears in the foreground or background of the captured image.

23. A system according to claim 1, wherein the reference image comprises a preview image.

24. A system according to claim 1, wherein the reference image comprises an image captured chronologically after said captured image.

25. A system according to claim 1, wherein the reference image comprises a combination of multiple reference-images.

26. A system according to claim 1, wherein said digital image acquisition system comprises a digital camera.

27. A system according to claim 1, wherein said digital image acquisition system comprises a combination of a digital camera and an external processing device.

28. A system as claimed in claim 27, wherein said segmentation tool is located within said external processing device.

29. A system according to claim 1, wherein said digital image acquisition system comprises a batch processing system including a digital printing device.

30. A system according to claim 1, wherein said digital image acquisition system comprises a batch processing system including a server computer.

31. A computer readable medium having code embodied therein for programming a processor to perform a method of analyzing a captured image, the computer readable medium comprising an analysis and classification tool for comparing at least a portion of a captured image and a reference image of nominally the same scene, one of said captured and reference images being taken with flash and the other being taken without flash, said tool providing a measure of relative differences in illumination between regions of said captured image and said reference image, and said tool for segmenting a foreground region from a background region within said scene based on said measure.

32. The computer readable medium of claim 31, further comprising a digital segmentation tool for determining one or more regions that are indicative of the foreground region, or of the background region, or of the background region and the foreground region, within at least one portion of a captured image, wherein said determining comprises comparing said captured image and a reference image of nominally the same scene, and wherein one of said captured and reference images being taken with flash and the other being taken without flash.

33. The computer readable medium of claim 32, wherein the captured and reference images have different pixel resolutions, and wherein the segmentation tool operates in conjunction with a pixel matching tool which is operative prior to application of the segmentation tool for matching the pixel resolutions of the captured and reference images at least in respect of said at least one portion.

34. The computer readable medium of claim 33, wherein said pixel matching tool utilizes up-sampling of the image of lower resolution or sub-sampling of the image of higher resolution, or both.

35. The computer readable medium of claim 32, wherein the segmentation tool operates in conjunction with an alignment tool which is operative prior to application of the segmentation tool for aligning said captured and reference images at least in respect of said at least one portion.

36. The computer readable medium of claim 32, wherein said segmentation tool operates in conjunction with an exposure equalizer for substantially equalizing an overall level of exposure of said captured and reference images at least in respect of said at least one portion.

37. The computer readable medium of claim 32, wherein said segmentation tool operates in conjunction with a face detection module or a red-eye filter, or both, for selective application to the foreground region.

38. The computer readable medium of claim 37, wherein said segmentation tool further operates in conjunction with a probability module for changing a probability of a redeye candidate region being an actual redeye region according to whether the candidate appears in the foreground or background of the captured image.

39. The computer readable medium of claim 37, wherein said segmentation tool further operates in conjunction with a depth of focus module for reducing a perceived depth of focus according to whether a candidate region appears in the foreground or background of the captured image.

40. The computer readable medium of claim 37, wherein said segmentation tool further operates in conjunction with a blurring module for blurring said regions indicative of background of the captured image.

41. The computer readable medium of claim 31, wherein the reference image comprises a preview image.

42. The computer readable medium of claim 31, wherein the reference image comprises an image captured chronologically after said captured image.

43. The computer readable medium of claim 31, wherein the reference image comprises a combination of multiple reference-images.

* * * * *